United States Patent

[11] 3,599,405

[72] Inventors Joseph C. Hurlburt
    Leola, Pa.;
    Horace G. McCarty, New Holland, Pa.;
    Joseph H. Cyr, Longvic Cote D'Or, France
[21] Appl. No. 882,403
[22] Filed Dec. 17, 1969
[45] Patented Aug. 17, 1971
[73] Assignee Sperry Rand Corporation
    New Holland, Pa.
    Continuation of application Ser. No. 589,543, Oct. 26, 1966, now abandoned.

[54] HEADER SUSPENSION
    16 Claims, 10 Drawing Figs.
[52] U.S. Cl. .................................................. 56/14.4, 56/1, 56/208
[51] Int. Cl. .................................................. A01d 43/10
[50] Field of Search .................................... 56/23, 208, 1, 20, 21, 1 C

[56] References Cited
UNITED STATES PATENTS
2,817,943  12/1957  Collins ........................ 56/208
3,325,981  6/1967   Glass et al. .................. 56/1 C Primary Examiner—Antonio F. Guida
Attorneys—Joseph A. Brown, Donald D. Schaper and Walter V. Wright ABSTRACT: An agricultural machine adapted for travel forwardly over the ground including a wheel supported frame, a header having crop-treating elements thereon pivotally mounted on the frame, link means operatively connecting the header to the frame, and lift means on the frame for pivoting the frame about a horizontal axis.

INVENTORS
JOSEPH C. HURLBURT
HORACE G. MC CARTY
& JOSEPH H. CYR
BY
ATTORNEY

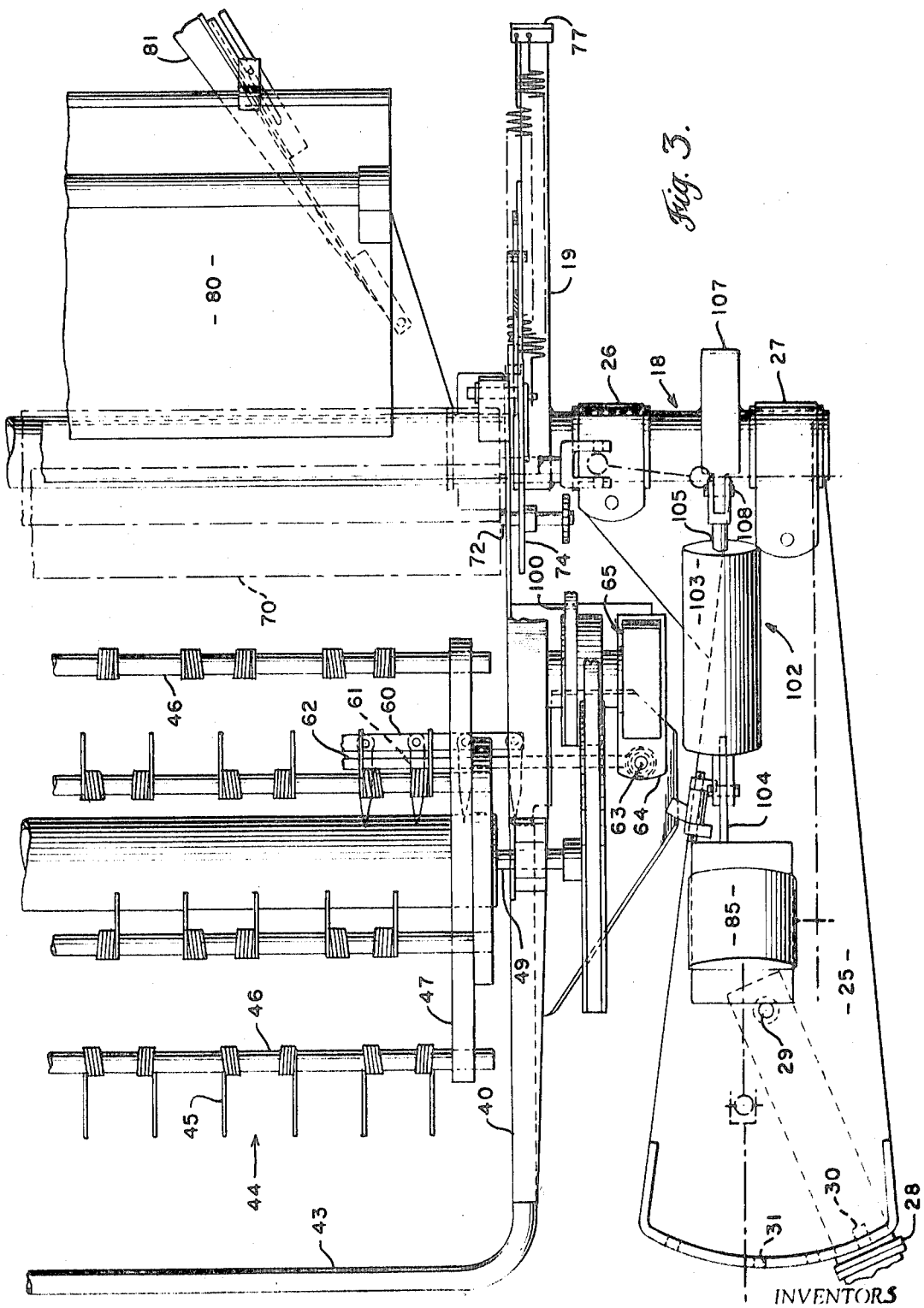

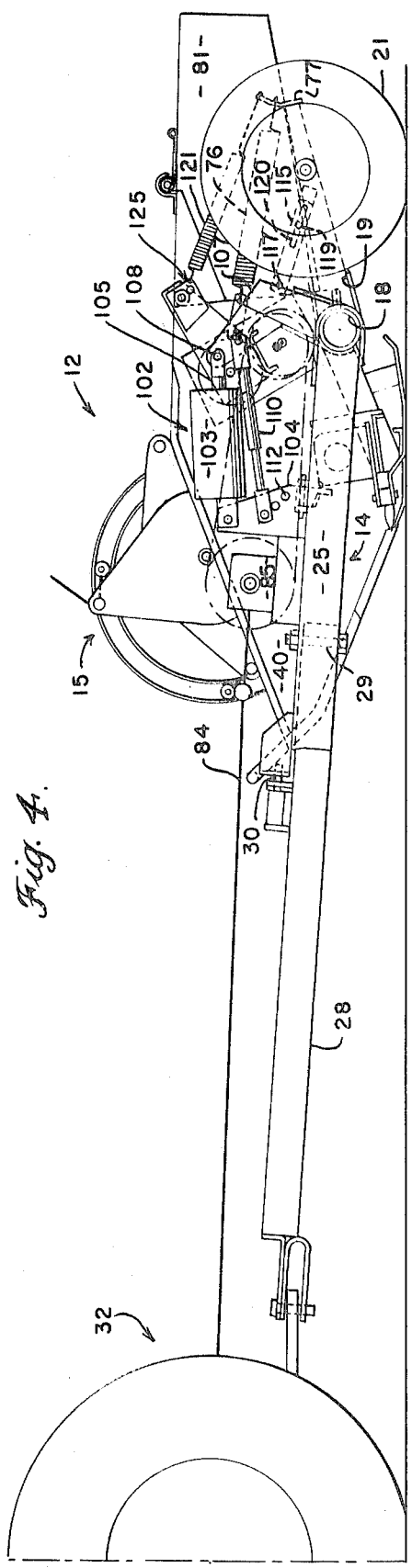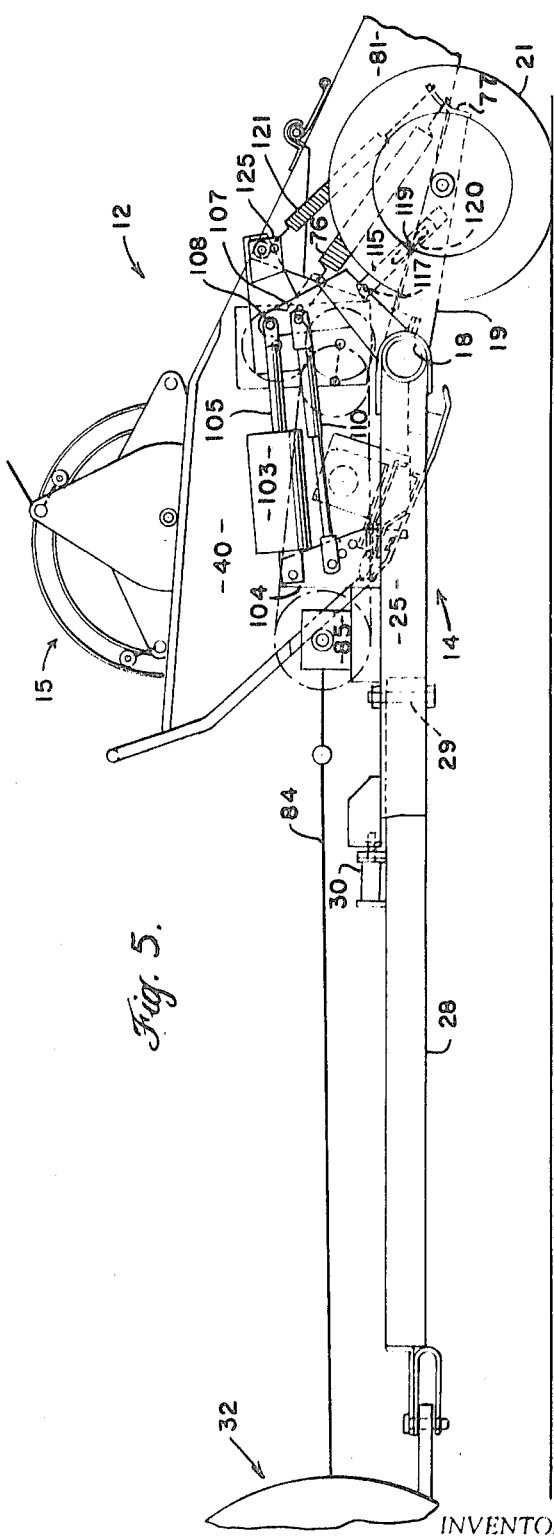

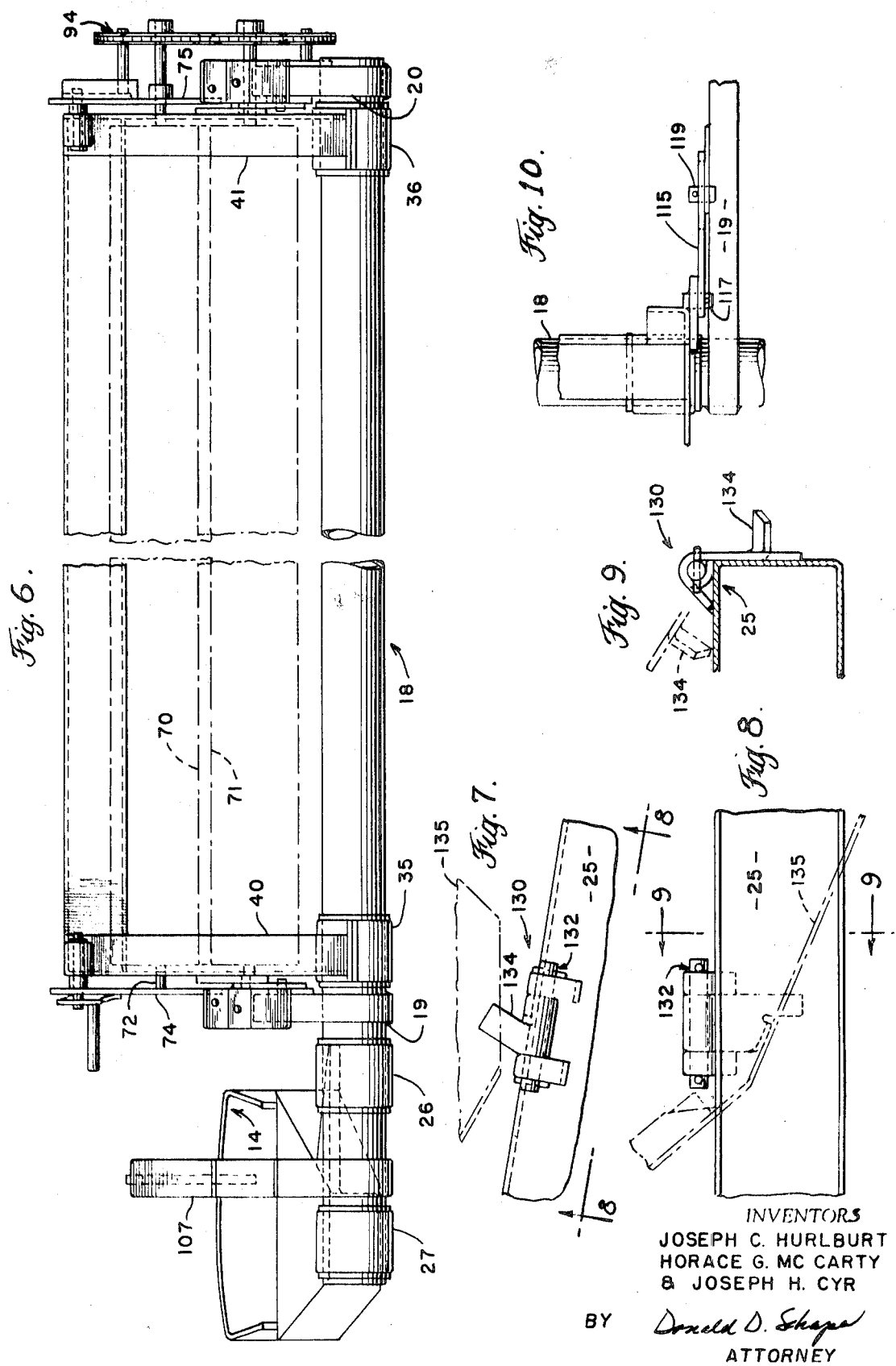

HEADER SUSPENSION

This application is a continuation of my application Ser. No. 589,543, filed Oct. 26, 1966, now abandoned.

The present invention relates generally to agricultural machines of the harvester type and like apparatus having adjustable crop-gathering headers. More particularly, the invention relates to an improved frame and header suspension in a mower-conditioner.

Machines of the above general character may be towed behind a tractor and comprise a header which is vertically adjustable to accommodate varying heights of crop material and to permit the header to be raised to a transport position. The header consists of a mower for severing the crop material, a reel for raking the material rearwardly from the mower, and conditioner rolls which receive the crop material from the reel and discharge it rearwardly in a swath or into windrow-forming means. There are two common types of adjustable headers in the prior art, namely, a pivotally mounted header in which vertical adjustment is achieved by pivoting the header about a horizontal axis, and a header which is fixed relative to the machine frame and is adjusted by raising and lowering the entire machine frame.

In the pivotally mounted type of header, the crop-treating elements are normally mounted on a subframe which is journaled on the main frame structure of the machine. In operation, the subframe is pivoted about fixed shafts on the frame structure by a hydraulic actuator or other means. The pivotally mounted header is relatively simple to adjust. One disadvantage of this type of header mounting, however, is that it is difficult to get the necessary vertical lift of the crop-treating elements which are mounted close to the pivotal axis. Further, due to the amount of weight involved in the header, the size of header which can be mounted in this way is limited.

In the fixed type of header mounting, the header is mounted to the machine frame. When a vertical adjustment is desired, the entire frame is raised or lowered. The fixed header mounting crop-treating the advantages of strength and rigidity. It is also possible to obtain a more desirable location of the crop-treating elements than in the pivotally mounted header, because for each vertical adjustment all of the elements are moved an equal amount. The main disadvantage of this type of header is that a considerable amount of energy is required to perform the adjustment function. The lifting components must be extremely heavy to withstand the loads involved, and thus the components are more expensive. It is also difficult to obtain a precise adjustment of the header because of the heavy weight which must be moved each time an adjustment is made.

One object of the present invention is to provide an improved frame and header adjustment means in a mower-conditioner of the type described which affords the high-operating efficiency of pivotally mounted headers, and at the same time realizes the advantages of rigidity and crop-treating element orientation heretofore obtainable only with fixed type header mountings.

Another object of this invention is to provide an adjustable header which is particularly adapted for adjustment during field operation and can be easily and precisely adjusted to a desired operating position.

Another object of this invention is to provide an adjustable header which can be raised or lowered by the combined action of pivoting the header about a supporting frame and simultaneously raising and lowering the supporting frame.

Another object of this invention is to provide a novel mounting for a header wherein the mounting is pivoted to vertically adjust the header.

Another object of this invention is to provide a pivotally mounted header wherein the header center of gravity is closely adjacent the pivotal axis to facilitate adjustment of the header.

Another object of this invention is to provide a novel frame structure in a mower-conditioner in which a single-frame element serves to support the header and to transmit pivotal movement thereto.

A further object of this invention is to provide means for selectively controlling the upper limit of travel of an adjustable header.

A still further object of this invention is to provide a frame and header suspension for a mower-conditioner which is of simplified construction and is economical to manufacture.

Other objects of this invention will be apparent hereinafter from the specification and from the recital in the appended claims.

In the drawings:

FIG. 3 is a fragmentary plan view showing the relation of the reel, the rolls (in dot-and-dash lines), and the lift mechanism, with the drives to the crop-treating elements indicated diagrammatically;

FIG. 4 is a side elevational view of the mower-conditioner, with the towing vehicle indicated fragmentarily at the forward end of the machine, and showing the header in an operative position;

FIG. 5 is a view similar to FIG. 4, but showing the header in a raised position for transport, and showing the header in engagement with the header stop means;

FIG. 6 is an end view looking toward the left in FIG. 1 showing the transversely extending rockshaft, the header subframe, the wheel arms, and the conditioner rolls (indicated diagrammatically);

FIG. 7 is a fragmentary plan view of the header stop and showing a portion of the sickle shoe guard (indicated in dot-and-dash lines) in engagement with the stop;

FIG. 8 is a fragmentary view of the header stop looking as indicated by the arrows 8—8 of FIG. 7;

FIG. 9 is a section taken on the line 9—9 of FIG. 8, with the stop shown in its operative position in full lines and in its inoperative position in dot-and-dash lines; and FIG. 10 is a fragmentary plan view of the slotted connecting link and showing its pivotal connection to the header and to the wheel arm.

Figure 1:
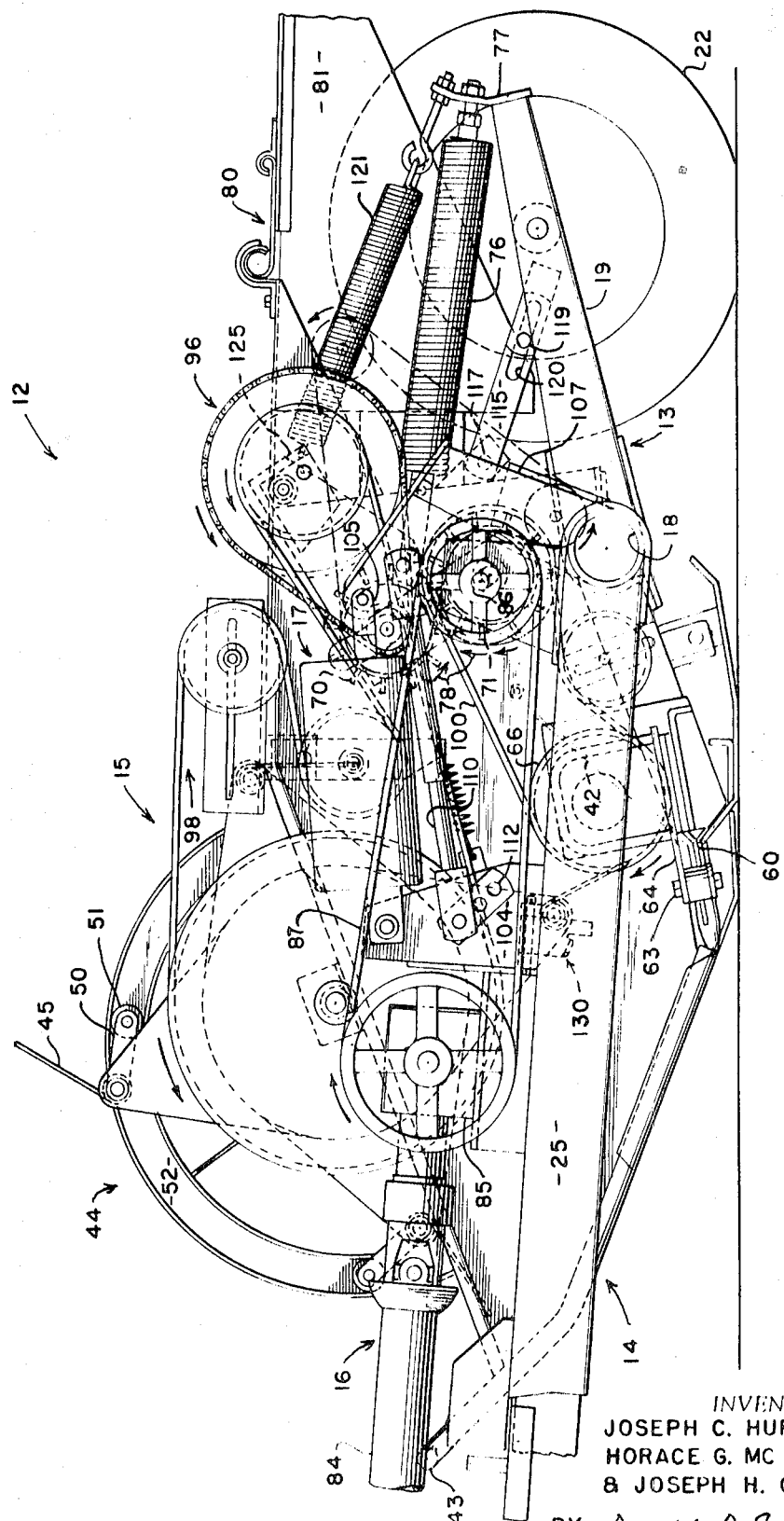
FIG. 1 is a side view of the mower-conditioner constructed in accordance with the principles of the present invention and showing the drive system, the header, and the machine frame.
Figure 2:
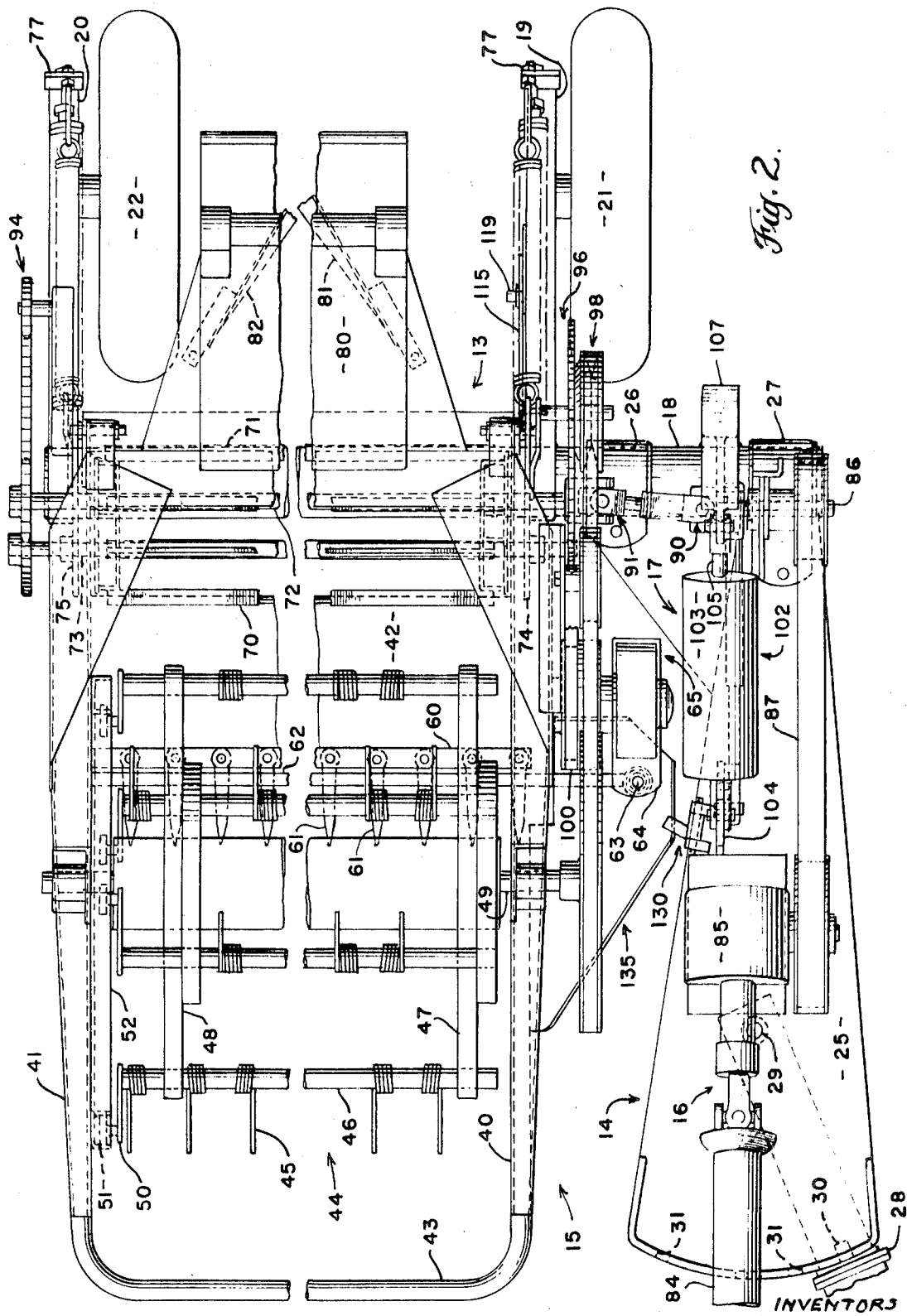
FIG. 2 is a plan view of FIG. 1 with the central portion of the machine broken out to condense the FIGURE.

Referring now to the drawings by numerals of reference, and particularly to FIGS. 1 and 2, the machine of this invention is designated generally 12 and comprises a transversely extending frame structure 13, a draft frame 14 along what will be referred to as the inboard side of the machine, a header 15 which extends from adjacent the draft frame to the machine outboard side, a drive system 16 which furnishes power to crop-treating elements carried on header 15, and a lift means 17 for vertically adjusting header 15.

Frame structure 13 consists of a rockshaft 18, an inboard wheel arm 19 fixed to rockshaft 18, as by welding, an outboard wheel arm 20 fixed to rockshaft 18, and a pair of wheels 21 and 22 journaled respectively in wheel arms 19 and 20.

Draft frame 14 comprises a massive center section 25 and a pair of rearwardly located bearing elements 26 and 27 which support draft frame 14 on rockshaft 18 for rotatable movement thereabout. A tongue 28 is pivotally mounted to center section 25 at 29 and has a pin member 30 which can be selectively positioned in any of a series of holes 31 in section 25, depending on the towing position desired. As shown in FIGS. 4 and 5, tongue 28 is adapted to be connected to a towing vehicle 32, indicated fragmentarily, for travel through a field.

Header 15 is pivotally supported on rockshaft 18 by a pair of mounting sleeves 35 and 36, best shown in FIG. 6. Header 15 comprises a subframe for supporting the crop-treating elements and which consists of side panels 40 and 41, a guide plate 42 extending between and joining the side panels at their lower edges, and a crop engaging bar 43 which extends across the forward end of the subframe.

A reel 44 is rotatably mounted in the header side panels 40 and 41 and has crop-engaging fingers 45 which are carried on bars 46 at the outer periphery of the reel. Bars 46 are journaled in reel spiders 47 and 48 which are carried on reel shaft 49. As seen in FIGS. 1 and 2, each of the bars 46 has a crank arm 50 carried on its outboard end. Each of the arms 50 carries a roller-type cam follower 51 at its one end. The followers 51 ride in a channel-shaped cam track 52 which causes the tines 45 to travel in the desired path in a well known and conventional manner.

A mower cutterbar 60, as shown in FIGS. 1, 2, and 3, is mounted on header side panels 40 and 41 and extends therebetween. A plurality of conventional sickle guards 61 are fixedly mounted on cutterbar 60, and a sickle bar indicated at 62 reciprocates on the guards. As shown in FIG. 2, the inboard end of sickle bar 62 is pivotally connected at 63 to the forward end of a fore-and-aft extending rocker arm 64. Rocker arm 64 is reciprocated by a wobble drive 65 which receives power from an input pulley 66, best shown in FIG. 1. The drive means for supplying power to input pulley 66 will be described hereinafter.

An upper conditioner roll 70 and a lower conditioner roll 71 are mounted to a header side panels 40 and 41 at a location rearwardly of the mower and reel. Upper conditioner roll 70 includes a shaft 72 which is journaled in brackets 74 and 75 pivotally mounted respectively on side panels 40 and 41. The pivotally mounted brackets 74 and 75 permit roll 70 to move toward and away from lower conditioner roll 71 to compensate for different loads of crop material, and roll tension springs 76 extending between brackets 74 and 75 and flanges 77 on wheel arms 19 and 20 serve to bias roll 70 toward lower roll 71. Rolls 70 and 71 rotate in the directions indicated by arrows 78 in FIG. 1, and a crop-receiving bite is defined by the rolls just rearwardly of arrows 78.

A horizontally extending crop deflector plate 80 and windrow shields 81 and 82 are mounted at the rear end of header 15 to receive the crop material from conditioner rolls 70 and 71 and direct the material to the ground in the desired form.

Drive system 16 (see FIGS. 1 and 2) comprises a PTO shaft 84, which receives power from the towing vehicle and delivers it to a gearbox 85 on draft frame 14. Power is transmitted rearwardly from gearbox 85 to a stub shaft 86, journaled at the rear end of draft frame 14, by a belt 87. Shaft 86 drives lower roll shaft 88 through a pair of universal joints 90 and 91. Lower roll shaft 88 drives the upper roll shaft 72 through a chain drive 94 on the outboard side of the machine. Upper roll shaft 72 then transmits power, at the inboard side of the machine, to reel shaft 49 through a chain drive shown at 96 and a belt drive shown at 98. A drive belt 100 transmits power to the input pulley 66 of wobble drive 65 from lower roll shaft 88.

It will be seen from the foregoing description, that the reel, mower, and conditioner rolls will be continuously driven whenever power is furnished to gearbox 85 through PTO shaft 84.

Lift means 17 for moving header 15 from an operative position, as shown in FIG. 4, to a transport position, as shown in FIG. 5, is provided by a hydraulic actuator 102 which receives pressurized fluid from the tractor or towing vehicle 32, through a hydraulic power line, not shown. Hydraulic actuator 102 comprises a cylinder 103 which is fixed to a vertically extending bracket 104 on draft frame 14, and a reciprocating piston 105. Piston 105 serves to rotate rockshaft 18 through a bellcrank 107 pinned to piston 105 at 108 and welded, or fixed by other means, to rockshaft 18. A telescoping stop 110 is connected to bracket 104 and bellcrank 107 to limit the movement of header 15 in a clockwise direction, as viewed in FIG. 4. Holes 112 are provided in bracket 104 so that stop 110 can be adjustably positioned thereon to determine the lowermost position of header 15.

Lift means 17 transmits pivotal movement to header 15 through wheel arms 19 and 20 which are fixed at their inner radial ends to rockshaft 18, and through connecting links 115 which are fixed to header side panels 40 and 41 by pins 117. It will be seen that each link 115 is connected to its respective wheel arm by a pin 119 which extends through a slot 120 in link 115; thus, when wheel arms 19 and 20 are rotated, no pulling force will be exerted on header 15 by the connecting links 115 until pins 119 reach the end of slots 120. A pair of springs 121 are connected to flanges 77 on the wheel arms and to brackets 125 on the header side panels. Header 15 is maintained in operating position by springs 121, and a floating action takes place within the limits of slots 120.

With reference to FIGS. 1, 2, and 7—9, a header stop 130 is provided to limit the upper movement of header 15 when it is moved to the transport position. Header stop 130 is mounted to center section 25 of the draft frame 14 by a hinge connection 132, and the stop can be moved from an operative position, shown in solid lines in FIG. 9, to an inoperative position, shown in dotted lines in FIG. 9. In the operative position, a lip 134 on stop 130 will contact shoe 135 of the mower and prevent further upward movement of header 15. Stop 130 can be pivoted out of engagement with shoe 135 when it is desired to raise the header 15 to a "fully-up" position for maintenance or repairs.

An important feature of this invention is the simplified frame means for supporting header 15 and for transmitting pivotal motion thereto. Pivotal motion is transmitted to the header by rockshaft 18, and the rockshaft also serves as the only transverse frame member. Thus, this single structural member performs functions which previously required two or more elements. Further, by using the transverse frame element as the header pivotal support, there is no torque transmitted to the transverse frame element as a result of the header pushing on its pivotal supports. It is evident that an additional torque would be present, if the header pivotal supports were moved off of the horizontal axis of the transverse frame member.

A second feature of this invention is the addition of a second lifting means which works in combination with the pivotal adjusting means. The additional lift is accomplished through the action of wheel arms 19 and 20 on rockshaft 18. By adding a second lifting means to the novel pivotal support means described in the above paragraph, the crop-treating elements, and thus the center of gravity of the header, can be moved closer to the header pivotal axis. It will be apparent that less energy is required to vertically adjust the header when the center of gravity is closer to the pivotal axis. There is no problem in getting the necessary lift of the crop-treating elements adjacent the pivotal axis in the pivotally mounted header of this invention, because of the second lifting means.

It will be seen from the foregoing discussion that a novel and efficient pivotal support means is provided for a header in a mower-conditioner. Moreover, the combination of this pivotal support means with a second lift means provides the additional advantages herein noted.

Operation of the machine is as follows:

As the harvester 12 is towed through a field, the standing crop material is severed by the mower and is then raked rearwardly by the crop-engaging fingers 45 on the rotating reel 44. Fingers 45 deliver the material into the bite of conditioner rolls 70 and 71. The conditioner rolls discharge the material upwardly and rearwardly into windrow shields 81 and 82 which serve to consolidate the material and form it in a windrow.

When it is desired to raise header 15, either during field operation or for servicing, the operator actuates a hydraulic control valve on the tractor, not shown, which causes hydraulic actuator 102 to rotate rockshaft 18. As shown in FIGS. 4 and 5, when rockshaft 18 is rotated wheel arms 19 and 20 move in under the machine to raise rockshaft 18 and also cause header 15 to pivot about rockshaft 18 through the action of links 115.

While this invention has been described in connection with a particular embodiment thereof, it will be understood that it is capable of modification, and this application is intended to cover any variations, uses, or adaptations including such departures from the present disclosure as come within known or customary practice in the art to which the invention pertains, and as fall within the scope of the invention or the limits of the appended claims.

Having thus described our invention, what we claim is:

1. An agricultural machine which is adapted to travel through a field in a forward direction, said machine comprising:
   a. a wheel supported frame structure, including a laterally extending rockshaft, and having a pair of laterally spaced wheels operatively connected to said rockshaft rearwardly thereof;
   b. a draft frame pivotally connected to said rockshaft at one end thereof;
   c. a subframe pivotally mounted on said rockshaft adjacent said draft frame and extending away therefrom to an opposite end of said rockshaft, said subframe supporting crop-treating elements thereon and having a center of gravity disposed forwardly of said wheel connections;
   d. lift means on said draft frame and operatively connected to said rockshaft for pivoting said rockshaft about a horizontal axis; and
   e. means operatively connecting said subframe to said rockshaft rearwardly thereof whereby said lift means can pivotally move said subframe about said horizontal axis to provide a first adjusting means for said corp-treating elements.

2. An agricultural machine, as recited in claim 1, wherein said frame structure comprises a pair of radial rearwardly extending axially spaced wheel arms on said rockshaft and one of said ground engaging wheels being mounted on each of said wheel arms, and said wheel arms and the wheels attached thereto move said rockshaft in a vertical direction when said rockshaft is pivoted to provide a second adjusting means which cooperates with said first adjusting means.

3. An agricultural machine, as recited in claim 2, wherein said means operatively connecting said subframe to said rockshaft comprises a pair of connecting links which extend between said wheel arms and said subframe providing a lost motion connection between an intermediate portion of said wheel arms and said subframe.

4. An agricultural machine which is adapted to travel through a field in a forward direction, said machine comprising:
   a. frame means including a laterally extending wheel supported frame structure having a laterally extending rockshaft and a pair of laterally spaced ground-engaging wheels operatively connected to said rockshaft rearwardly thereof;
   b. a subframe pivotally mounted on said rockshaft, said subframe supporting crop-treating elements thereon and having a center of gravity disposed forwardly of said wheel connections;
   c. lift means on said frame means and operatively connected to said rockshaft for pivoting said frame structure about a horizontal axis; and
   d. link means extending between said frame means and said subframe for operatively connecting said subframe to said frame structure whereby the disposition of said crop-treating elements may be changed by simultaneously raising and lowering said frame structure and pivoting said subframe about said horizontal axis.

5. An agricultural machine, as recited in claim 4, wherein a pair of radial rearwardly extending axially spaced wheel arms are mounted on said rockshaft with one of said ground-engaging wheels mounted on each of said arms, intermediate the ends thereof.

6. An agricultural machine, as recited in claim 4, wherein said frame means comprises a draft frame pivotally mounted on one end of said rockshaft.

7. An agricultural machine, as recited in claim 5, wherein said link means comprises a pair of connecting links extending between an intermediate portion of said wheel arms and said subframe rearwardly of said rockshaft.

8. An agricultural machine, as recited in claim 5, wherein said lift means is operatively connected to said rockshaft, and when said lift means is actuated said wheel arms and the wheels attached thereto move said rockshaft in a vertical direction to provide a lifting action which cooperates with the pivotal movement of said subframe to adjust said crop-treating elements.

9. An agricultural machine adapted to travel through a field in a forward direction comprising;
   a frame structure including a laterally extending rockshaft;
   a subframe pivotally mounted on said rockshaft;
   a draft frame pivotally mounted on an end of said rockshaft;
   transversely extending stop means pivotally mounted on said draft frame and engageable with said subframe for selectively limiting pivotal movement thereof;
   arm means fixed to said rockshaft and extending radially rearwardly therefrom;
   wheel means mounted on said arm means, said wheel means being disposed rearwardly of said rockshaft and the center of gravity of said subframe;
   link means operatively connecting said rearwardly extending arm means to said subframe; and
   lift means for pivoting said rockshaft, whereby said subframe is adjustable by the combine action of pivoting the subframe about the frame structure and simultaneously raising and lowering the frame structure.

10. An agricultural machine, as recited, in claim 9, wherein said arm means comprises a pair of axially spaced wheel arms, and said wheel means comprises a wheel on each of said arms.

11. An agricultural machine, as recited in claim 9, wherein said lift means is supported on said draft frame and includes a hydraulic actuator.

12. An agricultural machine, as recited in claim 9, wherein said subframe comprises a pair of axially spaced vertically extending side panels pivotally mounted on said rockshaft, said panels extend forward from said rockshaft, a reel is journaled in the forward ends of said side panels, a pair of conditioner rolls are journaled in said panels rearwardly of said reel and a mower is supported on said panels under said reel, and drive means is provided for said reel, rolls and mower.

13. An agricultural machine, as recited in claim 11, wherein said subframe pivots through a path of travel and the limited pivotal movement of said stop means is into and out of said path of travel.

14. An agricultural machine, as recited in claim 13, wherein means is provided for raising and lowering said support means when said subframe is pivoted about said axis.

15. An agricultural machine as set forth in claim 1 wherein said wheel-supported frame structure includes laterally spaced arm means connected to said rockshaft and extending rearwardly therefrom, said laterally spaced wheels being rotatably mounted on said arm means with each wheel rotatable about an axis parallel to said rockshaft,
   said means operatively connecting said subframe to said rockshaft includes link means connected between said subframe and said arm means rearwardly of said rockshaft and while in the operative position permitting movement of said subframe around said rockshaft, and
   said subframe having its center of gravity adjacent said horizontal axis for minimization of the movement of the center of gravity and the lifting force on engagement of the ground forwardly of said rockshaft.

16. An agricultural machine, as recited in claim 15, wherein said subframe is pivotally mounted on said rockshaft and said link means comprises spring means between said arm means and said subframe for supporting said subframe and a pair of lost motion link straps extending between said arm means and subframe, said subframe being pivotal with respect to said rockshaft within the limits of said lost motion connection for movement of said subframe over a range of operative positions under the loading of said spring means.